United States Patent Office 3,417,145
Patented Dec. 17, 1968

3,417,145
METHOD FOR THE PREPARATION
OF ACROLEIN
Joseph W. Nemec, Rydal, Pa., and Francis W. Schlaefer, Pennsauken, N.J., assignors to Rohm & Haas Company, Philadelphia, Pa., a corporation of Pennsylvania
No Drawing. Filed Oct. 12, 1965, Ser. No. 495,329
4 Claims. (Cl. 260—604)

This invention deals with a method for the preparation of acrolein. It more particularly deals with a method for the preparation of acrolein from propylene employing a specific novel catalyst. Acrolein is a valuable intermediate in the synethesis of glycerine and acrylic acid. Glycerine has a wide variety of known uses. The acrylic acid is particularly useful in synthesizing a variety of resins having widespread use in the textile, paper and surface-coating fields.

The present invention comprises reacting propylene with oxygen in the presence of water and a specific copper molybdate catalyst. This method of acrolein production possesses several distinct advantages over those described in the prior art. Chief among these is the ability to produce acrolein in high yield while maintaining a reactor feedstream ratio of essentially one of propylene to one of oxygen. The vast majority of the catalysts described in the prior art produce fair to good yields of acrolein, but generally require propylene to oxygen ratios either substantially higher than or substantially lower than one to one. Both situations are, from an economic viewpoint, undesirable. Thus, ratios higher than one to one aggravate the already substantial problem of recovering the unreacted propylene while lower ratios do not make efficient use of the costly reactor and its attendant equipment. In contrast, the present invention produces acrolein in high yield while still operating with a propylene to oxygen ratio of substantially one to one.

Still another advantage of the present invention lies in its constant high performance over long periods of time. This is in sharp contarst to certain prior art catalysts which require the use of volatile arsenic, selenium or tellurium compounds. These gradually elute from the reactor and thereby cause a gradual decrease in catalytic activity and selectivity. Constant performance is highly important from an economic and operational standpoint. Thus, in the present invention, the high initial yield of acrolein is maintained over long periods of time. Consequently, there is no need for frequent shutdowns to charge fresh catalyst or to replenish the promoter. Furthermore, since there is no need to change operating conditions to adjust for catalyst deactivation, smoother and consequently more profitable production is obtained.

The present process is conducted in a temperature range of about 300° to about 500° C., preferably about 400° to about 450° C. The reaction may be conducted at atmospheric pressure or at pressures somewhat above atmospheric, such as about 1 to about 40 atmospheres. Generally, atmospheric pressure is preferred.

Oxygen may be used as such in the reaction or may be supplied as air. It is desirable in the present reaction to employ a diluent to facilitate control of this highly exothermic reaction. Therefore, if oxygen is employed as such, it is preferred to employ a gaseous diluent, such as carbon dioxide, nitrogen or the like. The carbon dioxide diluent is most economically provided from the carbon dioxide produced in the process. If oxygen is employed as the normal approximately 21% component of air, then nitrogen is already present as a useful diluent. Under certain circumstances, such as if recycling is intended, it is preferred to use oxygen itself. Otherwise, the use of oxygen as a component of air is quite satisfactory for the present purposes.

The propylene is employed in a ratio with respect to oxygen of 1:0.2 to 1:2, preferably 1:0.8 to 1:1.2. It is particularly desirable to have a substantially 1:1 ratio. It is entirely unnecessary to provide any appreciable excess of propylene over that previously set forth.

The ratio of water to propylene is about 1:1 to 15:1, preferably about 2:1 to 6:1. The contact time can range from 12 seconds to as low as 0.2 second, but about 0.6 second to about 4.0 seconds is preferred. Longer contact times generally produce higher propylene conversions, but this is accompanied by an increase in waste gas formation. One skilled in the art may balance these two factors to obtain the contact time which results in the most economical operations. Generally, operation from about 20 to about 60% conversion is satisfactory with about 30 to about 50% preferable. It is possible to operate at lower conversions where somewhat better selectivity is observed. The principal product of the present process is acrolein. Small amounts of acrylic acid, acetic acid, carbon monoxide and carbon dioxide are also formed but their formation is held at a very low level by virtue of the high oxidative selectivity of the present invention.

The copper molybdate catalyst is employed as pellets or other moderately sized particles, such as 10–20 mesh or larger particles, optionally on a carrier, such as silica, zirconia, pumice and the like.

The present invention may be more fully understood from the following illustrative examples.

PREPARATION OF CATALYST

A 500 g. quantity of ammonium heptamolybdate was dissolved, with stirring, in 500 ml. of deionized water and heated to 65° C. Another solution, prepared by dissolving 675 g. of cupric nitrate trihydrate in 750 ml. of deionized water at 65° C. was then slowly added, with stirring, to the ammonium heptamolybdate solution. The copper molybdate was precipitated by agitating the resultant mixture at 300 r.p.m. and then adding, dropwise, 380 ml. of a 15% aqueous ammonia solution. The ammonia addition period encompassed 27 minutes, during which time the solution temperature ranged between 36° and 40° C. During this interval, the pH gradually rose from 2 to 4½ while the yellow-green copper molybdate precipitate became increasingly thicker. Addition of ammonia in excess of 380 ml. results in a catalyst having a substantially lower copper/molybdenum ratio. Ammonia charges substantially less than 380 ml. result in incomplete precipitation.

The precipitated copper molybdate was filtered, with suction, and then washed on the filter with 5 one liter portions of deionized water. The filtrate produced by the first wash had an intense blue color, indicating a substantial cupric ion concentration. The color intensity gradually decreased as the washing proceeded, with the final wash having only a faint blue tinge. The filter cake was removed from the filter and slurried for one hour with one liter of deionized water. The slurry was then filtered, with suction. At this stage, the filter cake contained a large amount of entrained water and it was necessary to continually spread the precipitate over the cracks which developed in the filter cake. This produced a substantial vacuum in the filter flask and assured removal of a maximum quantity of water. The filtrate from this operation was colorless, thus signifying the absence of cupric ions in the filter cake. The filter cake was then charged to a tubular calciner and heated, in the presence of a 6 liter/minute air flow, to 100° to 170° C. over a 1½ hour period. This was marked by a continuous and heavy evolution of steam from the calciner. The temperature was then raised over a 3½ hour period to 550° to 645° C. This served to crack the ammonia out of the copper molybdate polymer. The oxides were then calcined by heating at 550° to 645° C. for another 32 hours. After cooling to room temperature, the yellow-green catalyst of the present invention was removed from the calciner and crushed to obtain 10–20 mesh particles. The calcined copper molybdate contained about 24% copper and about 49% molybdenum.

Example 1

A stainless steel tubular reactor, equipped with a preheater, was charged with 160 ml. of the aforementioned copper molybdate catalyst and heated in a molten salt bath at 448° C. A feedstream having a propylene/air/steam ratio of 1/4.6/4 was passed through the catalyst bed for 73 minutes, the contact time being 1.8 seconds. The yield of acrolein was 51%, while the propylene conversion was 44%. Acrylic acid, acetic acid, waste gas and saturated carbonyls were formed in 3, 2, 40 and 4%, respectively. The saturated carbonyls consisted mainly of acetone and acetaldehyde.

Example 2

A similar feedstream was passed through the same catalyst bed for 62 minutes, the contact time and reactor temperature being 1.8 seconds and 471° C., respectively. The yield of acrolein was 53%, and the propylene conversion 43%. The other products, acrylic acid, acetic acid, waste gas and saturated carbonyls, were formed in 4, 2, 38 and 4%, respectively.

Example 3

The catalyst bed, feedstream and contact time were all similar to those employed in Examples 1 and 2, above. The duration of the experiment, however, was 60 minutes, while the reactor temperature was 438° C. The propylene conversion was 41%, while the acrolein yield was 53%. Acrylic acid, acetic acid, waste gas and saturated carbonyls were also produced in 4, 2, 37 and 4%, respectively.

Example 4

A feedstream, having a propylene/air/steam ratio of 1/4.6/4, was passed over the same bed of catalyst, described in Examples 1 to 3. The duration of the experiment was 60 minutes, while the bed temperature and contact time were 422° C. and 1.8 seconds, respectively. The yield of acrolein increased to 58%, but the propylene conversion fell to 17%. The yields of acrylic acid, acetic acid, waste gas and saturated carbonyls were 8, 3, 27 and 5%, respectively.

Example 5

A feedstream, having a propylene/air/steam ratio of 1/4.6/4, was passed over a catalyst bed similar to that described above. The duration of the experiment and the reactor temperature was 69 minutes and 450° C., respectively. The contact time, however, was lowered to 0.8 second. The propylene conversion was 22%, while the yield of acrolein increased to 68%. Additionally, acrylic acid, acetic acid, waste gas and saturated carbonyls were formed in 4, 2, 21 and 5%, respectively.

Example 6

The feedstream, catalyst bed and contact time were all similar to those employed in Examples 1 to 4. The duration of the experiment, however, was increased to 6.25 hours while the reactor temperature was held at 450° C. The yield of acrolein was 50% and the propylene conversion 41%. Acrylic acid, acetic acid, waste gas and saturated carbonyls were also formed in 4, 2, 40 and 4%, respectively.

We claim:

1. A method for the production of acrolein comprising reacting propylene, oxygen and water in the range of about 300° to about 500° C. in the presence of a catalyst consisting essentially of calcined copper molybdate, in which the range of propylene to oxygen is about 1:0.2 to 1:2 and water to propylene is about 1:1 to 15:1.

2. A method for the production of acrolein comprising reacting propylene, oxygen and water in the range of about 300° to about 500° C. in the presence of a catalyst consisting essentially of copper molybdate, in which the range of propylene to oxygen is about 1:0.8 to 1:2 and water to propylene is about 2:1 to 6:1, in which contact times of about 0.2 to about 12 seconds are employed, said copper molybdate catalyst being prepared by calcining the oxides of copper and molybdenum by heating to at least 550° C.

3. A method according to claim 2 wherein said oxygen is supplied as a component of air wherein the reaction is conducted at substantially atmospheric pressure.

4. A method for the production of acrolein comprising reacting propylene, oxygen and water in the range of about 400° to about 450° C. in the presence of a catalyst consisting essentially of copper molybdate in which the range of propylene to oxygen is about 1:0.8 to 1:2 and water to propylene is about 2:1 to 6:1, in which contact times of about 0.6 to about 4.0 seconds are employed, said copper molybdate catalyst being prepared by calcining the oxides of copper and molybdenum by heating to at least 550° C.

References Cited

FOREIGN PATENTS 839,808   8/1960   Great Britain.

LEON ZITVER, *Primary Examiner.*

R. H. LILES, *Assistant Examiner.*

U.S. Cl. X.R.

252—467